United States Patent [19]

Suzuki et al.

[11] 4,342,051

[45] Jul. 27, 1982

[54] METHOD OF AND SYSTEM FOR REPRODUCING OR TRANSMITTING HALF-TONE IMAGES

[75] Inventors: Kazufumi Suzuki; Shumi Kumagai; Yuetsu Ochiai; Akira Mizoguchi, all of Kawasaki, Japan

[73] Assignee: Matsushita Electric Industrial Company, Limited, Osaka, Japan

[21] Appl. No.: 143,492

[22] Filed: Apr. 24, 1980

[30] Foreign Application Priority Data

Apr. 27, 1979 [JP] Japan .................. 54-53099

[51] Int. Cl.³ .................. H04N 1/04; H04N 1/22
[52] U.S. Cl. .................. 358/283; 358/298
[58] Field of Search .................. 358/296–301, 358/280, 283

[56] References Cited

U.S. PATENT DOCUMENTS

| | | | |
|---|---|---|---|
| 3,604,846 | 9/1971 | Behane | 358/298 |
| 3,689,693 | 9/1972 | Cahill et al. | 358/296 |
| 3,922,484 | 11/1975 | Keller | 358/283 |
| 3,977,007 | 8/1976 | Berry et al. | 358/298 |
| 4,084,259 | 4/1978 | Cahill et al. | 358/298 |
| 4,184,206 | 1/1980 | Harano | 358/283 |
| 4,210,936 | 7/1980 | Cinque et al. | 358/298 |
| 4,240,118 | 12/1980 | Wellendorf et al. | 358/298 |
| 4,258,393 | 3/1981 | Ejiri et al. | 358/283 |

FOREIGN PATENT DOCUMENTS

2221901 12/1972 Fed. Rep. of Germany .

OTHER PUBLICATIONS

Klensch et al., "Electronically Generated Halftone Pictures", *RCA Review*, Sep. 1970, pp. 517–533.
Stucki, "Optimal Digital Halftone Pattern Generation Method", *IBM Tech. Disc. Bulletin*, vol. 17, No. 9, Feb. 1975, pp. 2779–2780.
Gupta, "Production of Pseudo-Halftone Images", *IBM Tech. Disc. Bulletin*, vol. 19, No. 1, Jun. 1976, pp. 290–291.
Machol, "Peudo Halftone for Representating Continuous Tone Images in Black–White Facsimile Systems", *IBM Tech. Disc. Bulletin*, vol. 9, No. 6, 11/66, pp. 636–637.

*Primary Examiner*—Raymond F. Cardillo, Jr.
*Attorney, Agent, or Firm*—Lowe, King, Price & Becker

[57] ABSTRACT

An original image field is successively scanned along each of parallel line paths to detect the image density of the scanned elemental picture area. A plurality of recurring sequences of binary digits or pulses is generated for each of the scanned line paths in synchronism with the scansion of each elemental picture area, thereby forming dot pattern conversion matrices corresponding in number to the number of discrete gradation steps or image densities with the pulses representing the dots in each matrix. The detected image density is used to select a corresponding one of the dot pattern matrices to represent the scanned area with a dot if the latter is present in a specified position in the corresponding matrix by allowing the selected recurring pulse sequence to be delivered to a recording unit which is moved with respect to a recording field in synchronism with the scansion of the original field.

6 Claims, 23 Drawing Figures

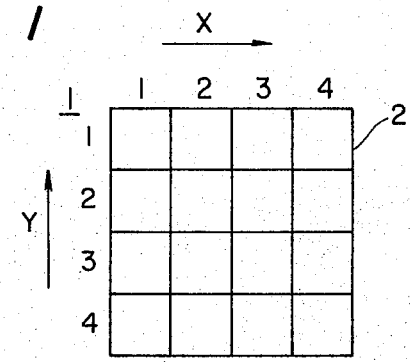
FIG. 1
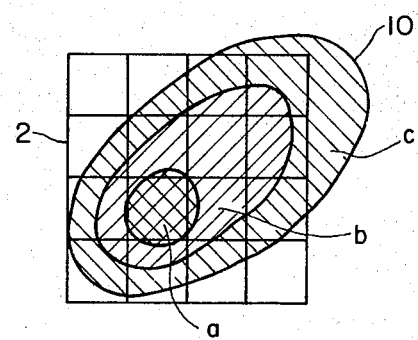
FIG. 3a
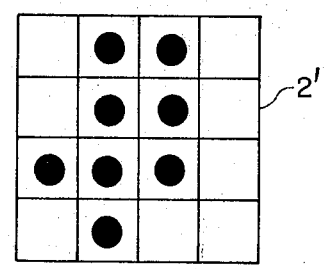
FIG. 3b
FIG. 3c

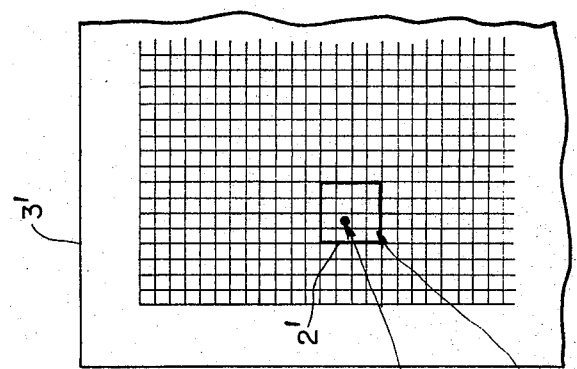
FIG. 2c
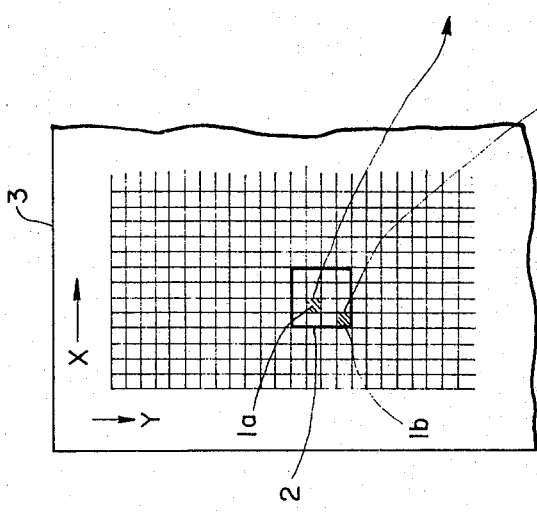
FIG. 2b
FIG. 2a

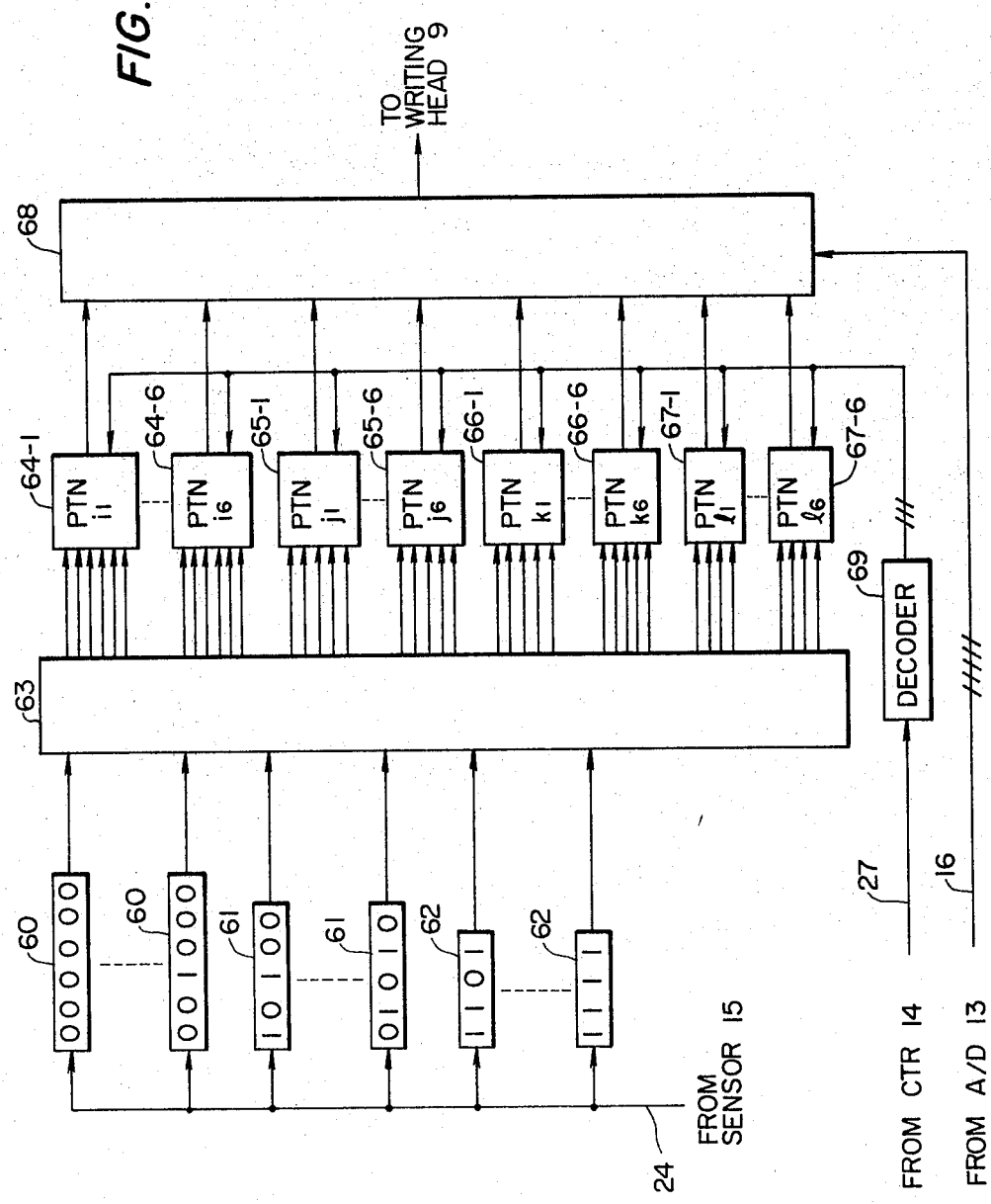

METHOD OF AND SYSTEM FOR REPRODUCING OR TRANSMITTING HALF-TONE IMAGES

BACKGROUND OF THE INVENTION

The present invention relates generally to signal conversion, and more particularly to a signal conversion or translating circuit for image transmission or recording systems. The invention also relates to an image recording apparatus incorporating the signal conversion circuit for improving the reproduced image quality by increasing the discrete steps of gradation during conversion of the original analog value of image density into a digital value.

One prior art method for recording half-tone images involves varying the size of a dot in a recording medium or field for each elemental picture area as a function of its image density or black level. However, difficulties have been encountered in varying the dot size in as many gradation steps as desired because of the limited range of variations.

Another prior art method involves varying the number and location of a dot within a matrix of rows and columns as a function of the image density of the elemental picture area. However, this prior art requires the use of a storage system in which the image density of elemental area is stored until it is converted into the corresponding dot matrix, resulting in an increase in cost.

Furthermore, the prior art methods fail to provide reproduction of images which are satisfactory in terms of gradation and sharpness.

SUMMARY OF THE INVENTION

Accordingly, the present invention is aimed at providing a conversion circuit for reproduction or transmission of half-tone images which enables representation of original half-tone images in large numbers of discrete gradation steps while maintaining the sharpness of the original image by conversion of the image density of each elemental picture area into a digital value through a plurality of dot conversion matrices.

According to a feature of the invention, a plurality of matrices each containing a dot or dots arranged in rows and columns is provided corresponding to the image densities or gradation steps of the scanned elemental picture area within the original image field, and the image density of the scanned elemental area is checked against the corresponding dot pattern matrix to detect the presence or absence of a dot in row-column position within that matrix corresponding to the position of the scanned elemental area within the original field to represent that area with a dot, if the latter is detected, in a recording field.

A further feature of the invention provides a conversion circuit in which a plurality of differing sizes of matrices each containing a dot or dots arranged in rows and columns is provided corresponding to the image densities or gradation steps of the scanned elemental area.

In accordance with a still further feature of the invention the difference between the average value of image densities of a plurality of elemental areas and the average value of image densities of the resultant image areas in the recording field is added up to the image density value of a subsequent elemental area to compensate for a slight difference between the original and recording fields which might occur as the rate of variations of image density approaches the spatial frequency of the scanned elemental areas.

The invention further provides a recording apparatus which combines the inventive conversion circuit with a circuit which permits direct recording of the analog image density value which exceeds beyond a predetermined value, while permitting the corresponding digital value to be recorded when the image density is lower than the predetermined value.

In practical embodiment of the invention, the original image field is scanned along each of parallel line paths composed of elemental picture areas to detect the image density of each scanned elemental area. Reentry type shift registers each containing binary digits arranged in predetermined binary positions are provided to generate a plurality of recurring sequences of binary digits or pulses for each of the scanned line paths in synchronism with the scansion of each elemental area. A selecting network is responsive to the detected image density to selectively couple the output of one of the shift registers to an output terminal which may be connected to a distant recording station or directly to a recording unit which is moved in synchronism with the scansion of the original image field to represent the scanned picture element with a binary digit or dot in a recording field.

BRIEF DESCRIPTION OF THE DRAWINGS

The invention will be further described by way of example with reference to the accompanying drawings, in which:

FIG. 2 is explanatory views for describing the principle of the invention, with FIG. 2a illustrating an original image field in the form of matrices defined by scanned plural lines; FIG. 2b illustrating conversion dot pattern matrices corresponding to the image density of the scanned area; and FIG. 2c illustrating a recording field also in the form of matrices corresponding to the original field;

FIGS. 3a–3c are explanatory views illustrating the process of analog-digital conversion according to the principle described with reference to FIG. 2;

FIG. 9 is an embodiment of the invention associated with FIG. 8;

FIG. 11, separately shown in FIGS. 11a, 11b and 11c, is explanatory views illustrating the process of compensating for lost image dots which might occur when the rate of density variations approaches the spatial frequency of the scanned elemental areas.

DETAILED DESCRIPTION

Figure 1I:
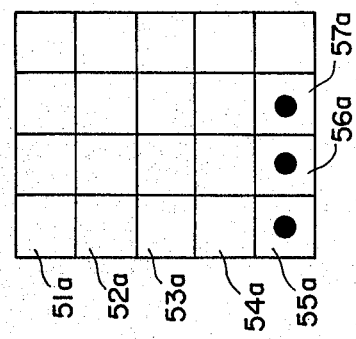
FIG. 1 is an explanatory view illustrating the designation of elements within a matrix.
Figure 1I:
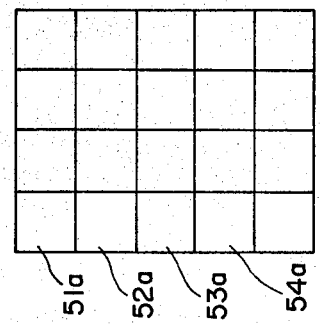
Figure 1I:
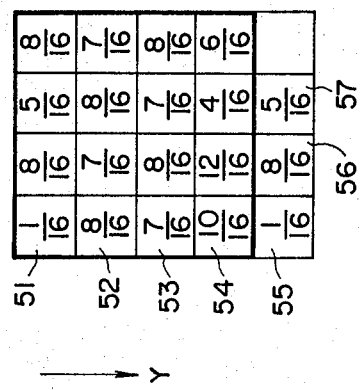

Prior to the description of the preferred embodiments of the present invention reference is first had to FIGS. 1 to 5 in which the principle of the invention is illustrated. In FIG. 1 picture elements within a single matrix 2 are illustrated for purposes of identifying each picture element by the number of rows and columns counted from the upper left corner of the matrix. A picture element 1, for example, is identified by X2, Y3 where X and Y respectively represent the columns and rows and also the directions in which the original picture field is scanned in a manner as will be described hereinbelow. For purposes of the disclosure the matrix is divided into four columns in the X direction and four rows in the Y direction.

The original picture field 3 is divided into a multitude of matrices as illustrated in FIG. 2a in which the matrix 2 is indicated by a single hatched area wherein two picture elements 1a and 1b having different black levels are shown with slanted lines of different spacings. As will be understood from the following description the picture field is electronically divided and so the field is not necessarily divided by visible lines. The concentration or black level of each picture element is detected as the field 3 is scanned and the analog value of the detected black level is converted into one of 16 discrete levels, for example, each of which corresponds to one of 16 different dot patterns as illustrated in FIG. 2b.

Each dot pattern is represented by the presence or absence of dot or dots arranged in a matrix identical to the matrix 2 of the original field. For example, the picture element 1a is assumed to have a concentration level 5/16 which corresponds to the pattern No. 5 which includes five dots (X1,Y1), (X2,Y1), (X2,Y2), (X2,Y3) and (X3,Y3). The apparatus according to the invention which will be described checks for correspondence between the location of the picture elements in the original matrix 2 and the location of matrix elements within the corresponding concentration pattern. Since the picture element 1a is located at X2,Y2 in matrix 2 and since a black dot is present in the X2,Y2 location in the corresponding pattern No. 5, the dot in the latter location is transferred to the corresponding location of a matrix 2' within a copy field 3' in FIG. 2c.

Likewise, the picture element 1b is assumed to have a concentration level 7/16 which corresponds to the pattern No. 7. Since there is no dot in the location X1,Y4 in the pattern matrix No. 7, the corresponding location in the matrix 2' of the copy field is left vacant.

If an original image 10 (see FIG. 3a) has different concentration levels as indicated by hatched areas a, b and c and each picture element in the matrix 2 is assumed to be represented by discrete concentration levels as shown in FIG. 3b, a corresponding dot matrix of FIG. 3c will be obtained for the image 10 and printed on the copy field. By comparison between FIGS. 3a and 3c, the average value of the discrete concentration levels within the matrix 2 of FIG. 3b is 8.1/16, while the average value of the concentration levels of the matrix 2' of FIG. 3c is 8/16 which substantially equals to the original average value.

Figure 4A:
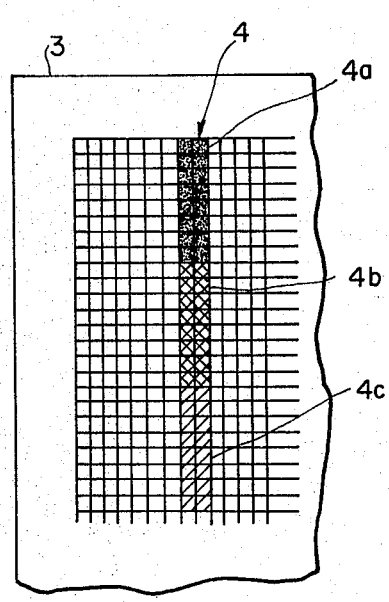
FIGS. 4a–4b and 5a–5b are illustrations of the conversion process of the invention.
Figure 4B:
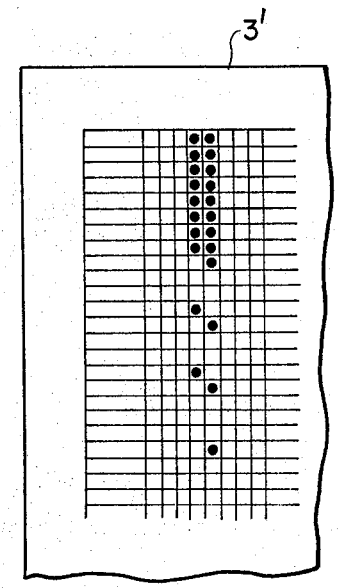
Figure 5A:
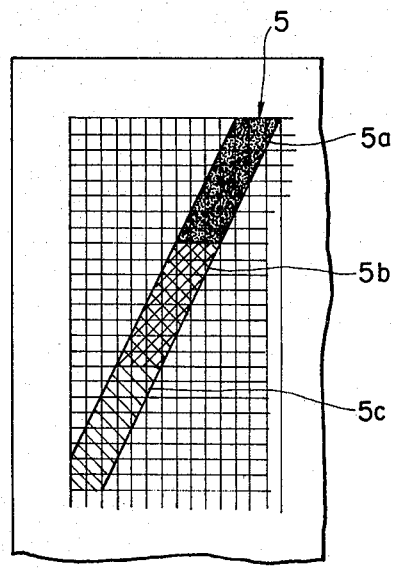
Figure 5B:
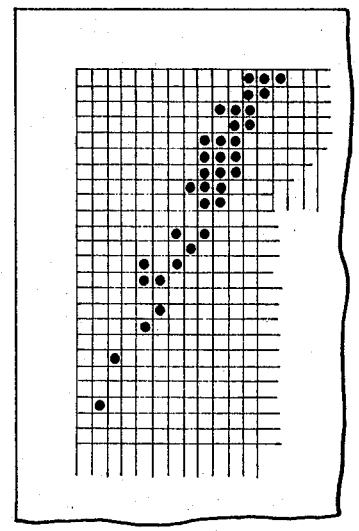

By the dot pattern conversion of the invention as described above, an image having three different image density areas 4a, 4b and 4c, shown in FIG. 4a, on the original image field 3 is converted into a dot pattern in a recording field 3' as shown in FIG. 4b. Likewise, a slanted line image 5 having three different density areas 5a, 5b and 5c (FIG. 5a) is converted into a dot pattern as shown in FIG. 5b.

Figure 6A:
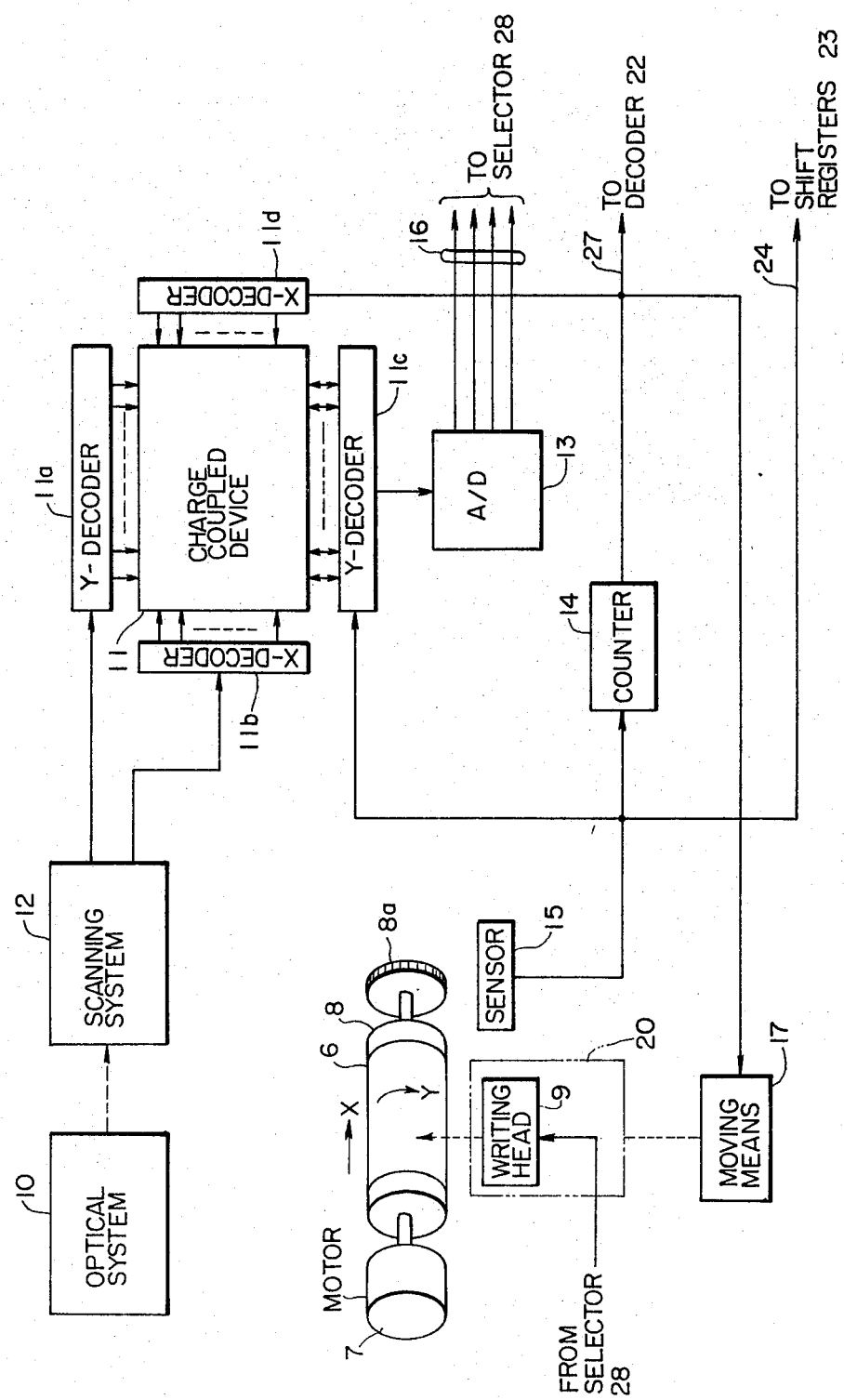
FIG. 6, separately shown in FIGS. 6a and 6b, is a practical embodiment of the principle of the invention.
Figure 6B:
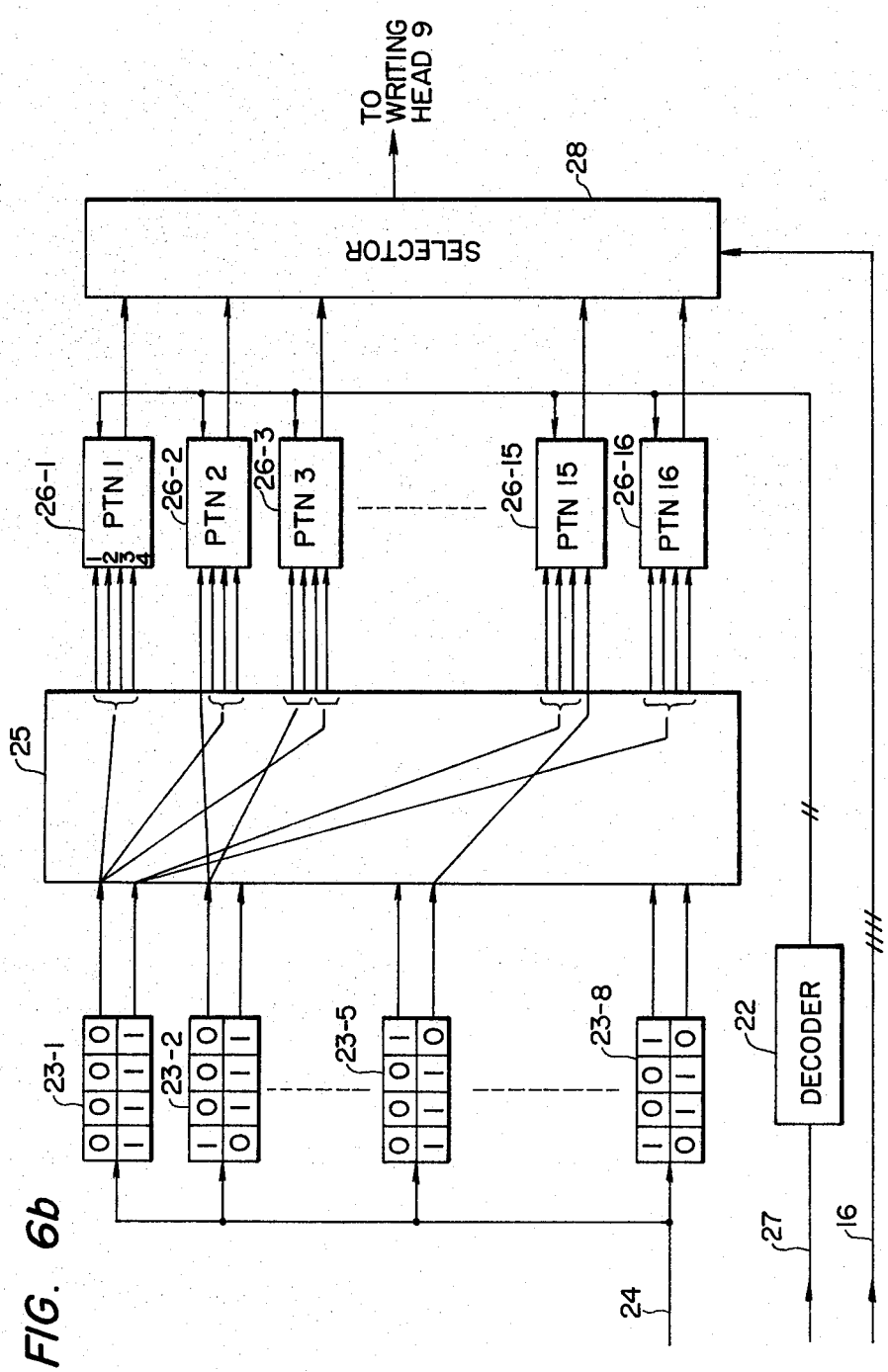

FIG. 6 is an illustration of a practical embodiment of the invention with two parts shown in FIGS. 6a and 6b. In FIG. 6a, an optical system 10 forms an optical image on a scanning system 12 such as television cameras to provide a video signal which is supplied to a charge-coupled device 11 through an input Y-decoder 11a in response to synchronization signals applied to X- and Y-decoders 11a and 11b from the scanning system 12. The charge-coupled device 11 thus serves as an original image field in which the original optical image is stored in analog values. Output X-decoder 11d and Y-decoder 11c are provided to scan the charge-coupled device 11 to retrieve the stored signal representing the image density of each elemental picture area of the original image field. The scanning signals are derived from an electromagnetic transducer 15 positioned with respect to a toothed wheel 8a of a magnetic material secured to the shaft of a rotary drum 8 which is turned by means of an electric motor 7. Pulses are thus developed in the sensor 15 as the wheel 8a rotates and supplied to the Y-decoder 11c as well as to a binary counter 14 as Y or row position indicating signals. More specifically, a Y position pulse is generated as the drum 8 is rotated by an amount equal to an elemental picture area of a recording medium or field 6 rolled around the drum 8.

The counter 14 generates an output pulse when the count reaches a number equal to the total number of elemental areas within one scanned line path, that is, the number of stored positions in the charge-coupled device 11 in the Y direction or column. The output pulse from the counter 14 is supplied to the output X-decoder 11d to address the stored signals in the next adjacent row, and is also supplied to a moving means 17 to move a carrier 20 by the width of a line path in the X direction. On the carrier 20 is mounted a writing head 9 which may be of an ink ejection unit responsive to a writing signal to eject a jet stream of ink to the surface of the recording medium 6. Therefore, the writing head 9 is continuously shifted in the Y direction with respect to the recording medium 6 as the drum 8 rotates and successively shifted in the X direction in response to the output from the counter 14, and as a result the scanned points on the recording field 6 are shifted in orthogonal directions in synchronism with the shifting of the point of retrieval on the image field of the charge-coupled device 11.

It is to be understood that the charge-coupled device 11 may be replaced with a plurality of random access memories and a plurality of input and output X- and Y-decoders associated with respective random access memories for storing a digitally converted video signal into a plurality of memory cells arranged in the Z axis of the random access memories.

The retrieved video signal from the addressed storage location of the charge coupled device 11 is applied to an analog-digital converter 13 where the input signal is converted into a 4-bit digital signal which is transmitted over conductors 16 to a selector 28 (FIG. 6b) for the purpose of selecting a corresponding dot pattern.

The dot pattern is generated in the circuit shown in FIG. 6b which includes a plurality of reentry type 4-bit shift registers 23-1 through 23-8 a part of which is illustrated for simplicity. The shift register 23 is of the type SN74165 available from Texas Instruments. Each shift register is formed by a pair of complementary shift registers in which binary digits are stored and shifted in response to the output from the sensor 15 supplied via conductor 24 to generate a set of 16 recurring sequences of pulses to represent the dot or dots arranged in each column of the dot patterns Nos. 1 to 16. The following binary data are stored in the shift registers 23-1 to 23-8:

| SHIFT REGISTER | TRUE OUTPUT | COMPLEMENTARY OUTPUT |
|---|---|---|
| 23-1 | 0 0 0 0 | 1 1 1 1 |
| 23-2 | 1 0 0 0 | 0 1 1 1 |
| 23-3 | 0 1 0 0 | 1 0 1 1 |
| 23-4 | 0 0 1 0 | 1 1 0 1 |
| 23-5 | 0 0 0 1 | 1 1 1 0 |
| 23-6 | 1 1 0 0 | 0 0 1 1 |
| 23-7 | 1 0 1 0 | 0 1 0 1 |
| 23-8 | 1 0 0 1 | 0 1 1 0 |

The outputs of the shift registers 23-1 to 23-8 are connected to input terminals of selecting circuits 26-1 to 26-16 by a connecting network 25 in a predetermined manner to generate a recurring column data which is shifted to the next column in response to an output of a decoder 22 which takes its input from the counter 14. Each of the pattern selecting circuits 26 is provided with four input terminals Nos. 1 to 4 which are connected to the outputs of the connecting network 25 and thence to the outputs of the shift registers 23. For example, all the inputs of the selecting circuit 26-1 are connected to the true output of the shift register 23-1 to generate the dot pattern No. 1. The selecting circuit 26-2, associated with the pattern No. 2, has its first input connected to the true output of the shift register 23-2, and the second to fourth inputs thereof are connected to the true output of the shift register 23-1. Likewise, the selecting circuit 26-15 has its first to third inputs connected to the complementary output of the shift register 23-1 and its fourth input connected to the complementary output of the shift register 23-5 to generate the dot pattern No. 15. The dot pattern No. 16 is likewise generated by the selecting network 26-16 whose inputs are all connected to the complementary output of the shift register 23-1.

The output terminal of each selecting circuit 26 is selectively connected to one of its input terminals in response to the two-bit binary control signal supplied from the decoder 22, so that the selecting circuit 26-3, for example, generates a recurring sequence of bit pattern "1 0 0 0" with each bit shifting in position in response to the shifting of each scanned elemental area during the time when a line path corresponding to the X1 column is being scanned.

The presence or absence of a "1" in the generated sequences of pulses in a position corresponding to the scanned point is detected by means of a selector 28 which receives a selection signal from the analog-digital converter 13 in four-bit binary form through conductors 16. The selector 28 has its 16 input terminals connected respectively to the outputs of the selecting circuits 26 and an output terminal connected to the writing head 9. This output terminal is selectively connected to one of its input terminals in response to the selection signal so that one of the 16 dot patterns is selected according to the image density of the scanned elemental area. If a "1" bit appears at the output of the selector 28, the scanned elemental picture area is represented by a dot in the recording medium 6 by activating the writing head 9 and if a "0" bit appears the scanned elemental area is left vacant.

Figure 7:
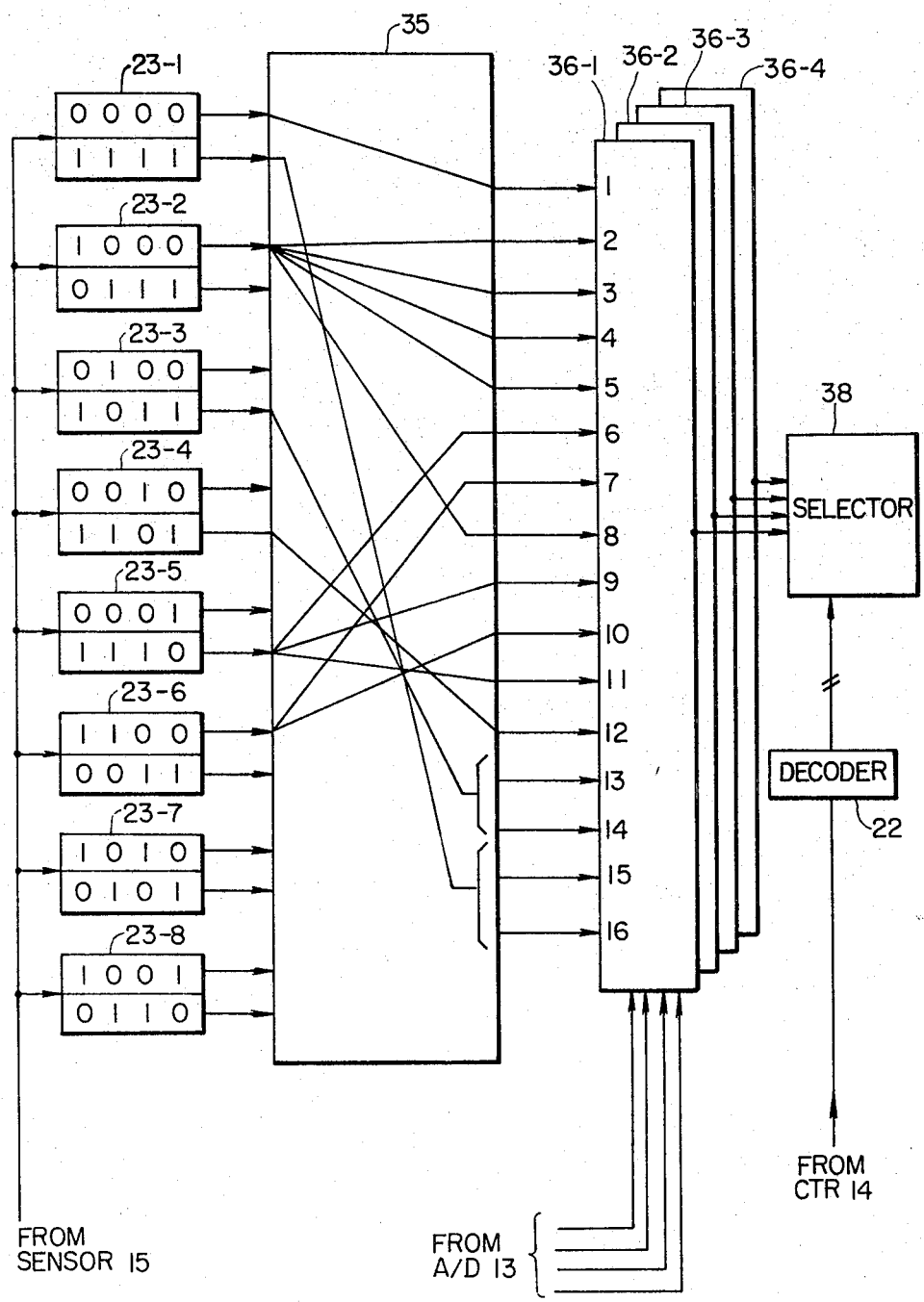
FIG. 7 is an alternative embodiment of the circuit of FIG. 6b.

The dot pattern generating circuit of FIG. 6b can alternatively be rearranged as shown in FIG. 7 in which parts corresponding to those of FIG. 6b are marked with the same reference numerals as in FIG. 6b. In the circuit of FIG. 7 a set of four selecting circuits 36-1 to 36-4 is provided each having 16 input terminals connected to the output terminals of a connecting network 35. For purposes of simplicity, only one selecting circuit 36-1 is shown connected to the connecting network 35. Each selecting circuit 36 receives a control signal from the analog-digital converter 13 to selectively connect the output of one of the shift registers 23-1 to 23-8 to a selector 38 to which the control signal is supplied from the decoder 22. The connecting network 35 is so wired that the pulses supplied to the inputs of the selecting circuits 36-1 correspond to the dots arranged in the column X1 of the dot matrices Nos. 1 to 16. Likewise the pulses supplied to the selecting circuit 36-2 correspond to the dots arranged in the column X2 of the dot matrices, and so forth. The output from the analog-digital converter 13 permits selection of a recurring sequence of 4-bit pulses according to the detected image density and the decoder 22 permits selection of a bit (0 or 1) from the selected pulse sequence depending on the position of the scanned line path.

In the foregoing description, each image field matrix or conversion dot matrix has a fixed number of matrix elements, i.e. four rows and four columns and in this embodiment the image density is resolved into 16 discrete steps of gradation. The total number of gradation steps can be increased to advantage by varying the size of the matrices as a function of the detected image density.

Figure 8C:
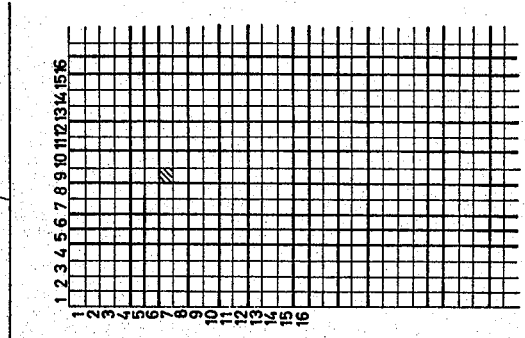
FIG. 8, separately shown in FIGS. 8a, 8b and 8c, is explanatory illustrations for describing a modified form of the invention.
Figure 8B:
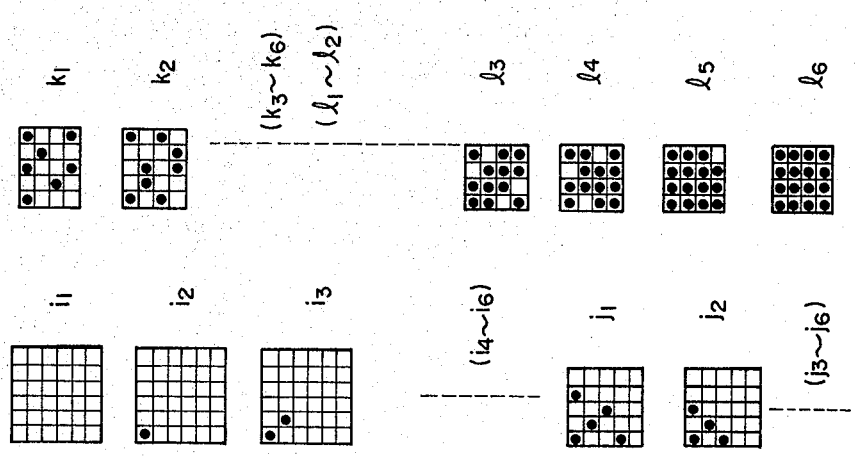
Figure 8A:
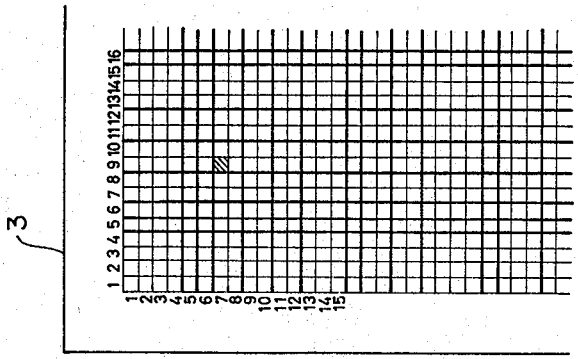

For this purpose, one example of the method for increasing the matrix size is illustrated in FIGS. 8a-8c. In this exemplary embodiment, 24 conversion dot matrices are provided which comprise six 6×6 matrices $i_1$ to $i_6$, six 5×5 matrices $j_1$ to $j_6$, six 5×4 matrices $k_1$ to $k_6$, and six 4×4 matrices $l_1$ to $l_6$, as illustrated in FIG. 8b. The number of dots contained in each matrix increases in proportion to the image density to establish correspondence between them as in previous embodiment.

When a picture element (hatched area in FIG. 8a) is scanned to detect its image density and if the latter corresponds to one of the conversion matrices $i_1$ to $i_6$, the original position of the scanned area in the field 3, which is X9,Y7, corresponds to the X3, Y1 position in the 6×6 matrices and if a dot is present in the latter position, a dot is recorded in the recording field 3' in the X9, Y7 position as illustrated in FIG. 8c.

FIG. 9 is an illustration of the pattern generator associated with the embodiment of FIGS. 8a-8c. A plurality of 6-bit reentry shift registers 60, 5-bit reentry shift registers 61 and 4-bit reentry shift registers 62 are provided to receive a shift pulse supplied from the sensor 15 to generate recurring sequences of binary digits. The outputs of the 6-bit shift registers 60 are connected through a network 63 to the six input terminals each of pattern selecting circuits 64-1 to 64-6 to generate 6×6 dot patterns. The outputs of the 5-bit shift registers 61 are connected to the five input terminals each of selecting circuits 65-1 to 65-6 to generate 5×5 dot patterns, and also to the four input terminals each of selecting circuit 66-1 to 66-6 generate 5×4 dot patterns. Likewise, the 4-bit shift registers 62 are connected to the four input terminals each of selecting circuits 67-1 to 67-6 to generate 4×4 dot patterns.

The pattern selecting circuits 64 to 67 receive the control signal from a three-bit decoder 69 which takes its input from the counter 14, so that the output of each selecting circuit is selectively connected to one of its input terminals in synchronism with the shifting of scanned line paths to generate a recurring sequence of pulses corresponding to the dots arranged in the column of the associated dot pattern matrix, the recurring pulse sequence being shifted to the next pulse sequence upon shifting of the scanned line path. Therefore, in each of the selecting circuits 64 there is produced a train of 6-bit recurring pulses for each of six scanned line paths, while in each of the selecting circuits 65 there is produced a train of 5-bit recurring pulses for each of five scanned line paths. Likewise, a train of 4-bit recurring pulses is generated in each of the selecting circuits 66 for each of five scanned line paths and a train of 4-bit recurring pulses is generated in each selecting circuit 67 for each of four scanned line paths.

The output terminals of the selecting circuits 64 to 67 are connected to a selector stage 68 to selectively couple one of the outputs of the selecting circuits to the writing head 9 in response to a five-bit control signal from the analog-digital converter 13 representing the image density of the scanned elemental picture area.

Figure 10:
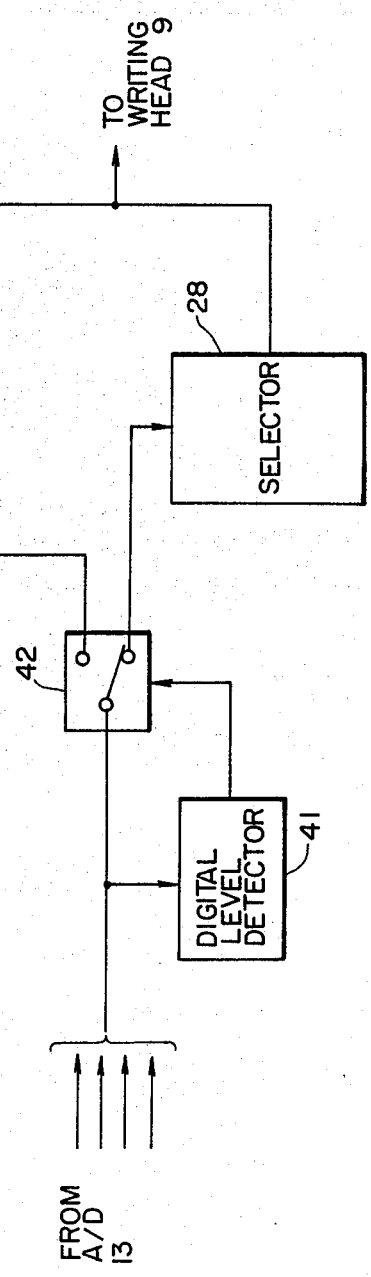
FIG. 10 is an illustration of a further modification of the invention which permits recording of images in analog value when the latter exceeds a predetermined value.

The gradation of reproduced image can be further improved by combining the previously described digitally converted image with an analog image where the gradation varies continuously. The circuit shown in FIG. 10 provides this digital analog combination. A digital level detector 41 is connected to the outputs of the analog digital converter 13 to detect the time when the image density of the scanned area is above a predetermined value. The digital signals from the analog-digital converter 13 are connected through a switch 42 to the selector 28 when the image density is lower than the predetermined level to permit selection of dots in the conversion matrices to provide a record of dots. The switch 42 is switched in response to the signal from the level detector 41 to connect the digital image density signal to a digital-analog converter 43 and thence to the writing head 9 to provide a record of an image in analog value. In this modified embodiment, the writing head 9 is preferably of the type capable of varying the dot size in the recording medium.

FIGS. 11a–11c are illustrations of a further modification of the present invention. In the previous embodiments, there is a likelihood of generating a record of all blank areas in a given matrix although such likelihood is very small, even if the average value of the image densities of that given matrix is substantial. A 4×4 matrix defined by a thick line in FIG. 11a has an average value of 8.3/16. Whereas, according to the method described with reference to FIGS. 2a–2c, the corresponding matrix in the recording field 6 has all of its elements filled with blanks as shown in FIG. 11b as a result of the absence of a dot in the corresponding location of the dot conversion matrix. Such conditions tend to occur when the rate of variations of image density is relatively high approaching the spatial frequency of the elemental areas. The lost image can be compensated for by adding a value of correction to the elemental areas of the next adjacent matrix on the recording field by detecting the average value of image densities associated with the elemental areas of the preceding matrix and the average value of image densities of the converted elemental areas and detecting the difference between the two average values. More specifically, an average density value $d_i$ is detected with respect to picture elements 51, 52, 53 and 54, shown in FIG. 11a, and compared with an average value $d_R$ of densities with respect to dot conversion matrix elements 51a, 52a, 53a and 54a to detect the difference between them. This difference value is multiplied with a constant R to give a correction value C which is added to the image density value $d_N$ of the next adjacent image element 55, so that the corrected value $d_N'$ is used to alter its corresponding dot pattern conversion matrix. For example, by assuming R=1.0, the value $d_i$ of the picture element 55 is 6.5/16 and since $d_R$ with respect to the areas 51a to 54a is zero, the correction value C is 6.5/16 and hence the value $d_N'$ is 5/16. Likewise, by applying the same procedure, the corrected value $d_N'$ for areas 56 and 57 is 16.7/16 and 11/16, respectively. This results in dots being recorded in areas 55a, 56a and 57a as illustrated in FIG. 11c.

Figure 12:
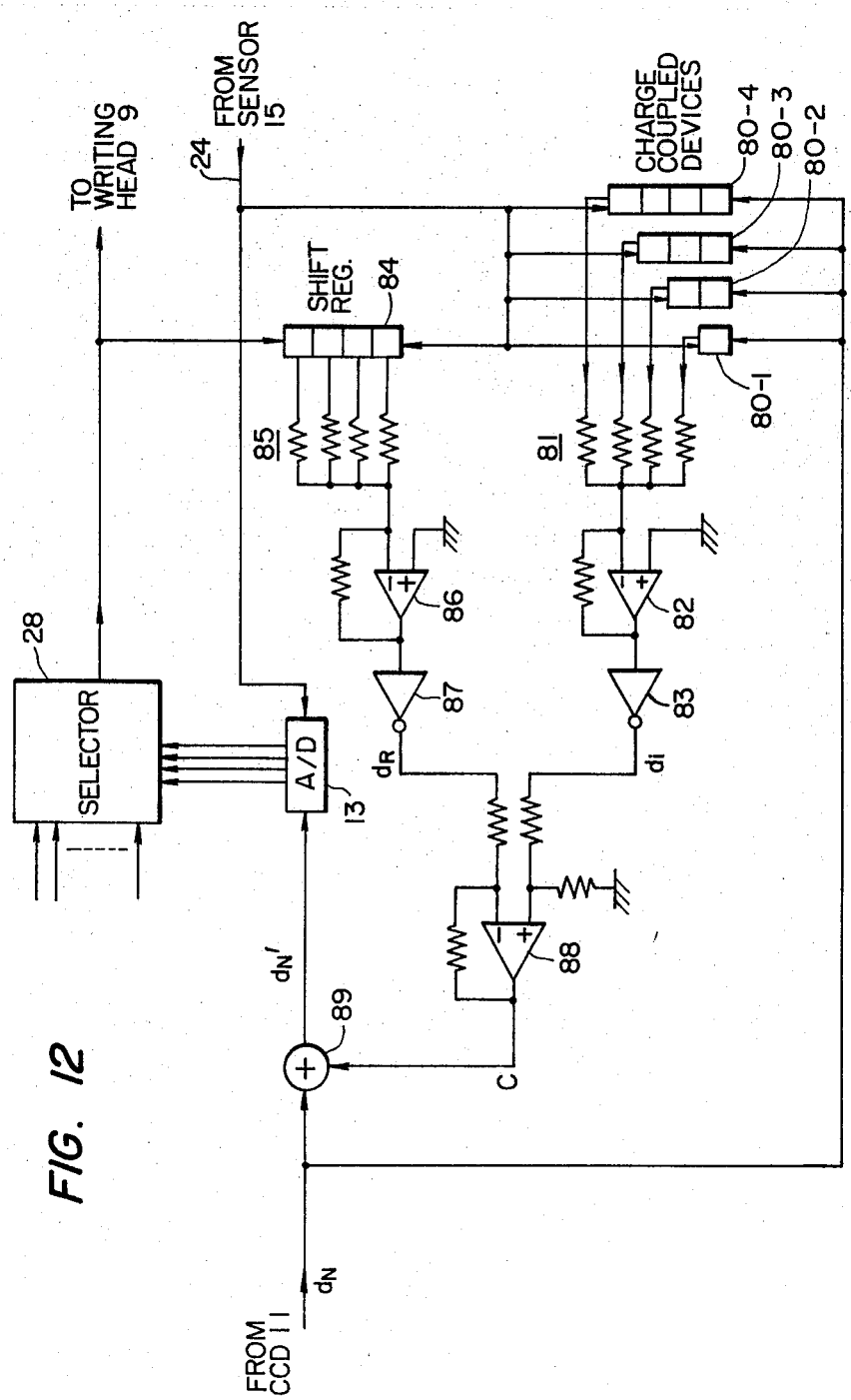
FIG. 12 is an illustration of a circuit associated with FIGS. 11a–11c.

The compensation is given by the following equation $$d_N' = d_N + R(d_i - d_R)$$

and accomplished by a circuit shown in FIG. 12 which comprises a set of four charge coupled devices 80-1 to 80-4 having respective input terminals connected to the output of the charge coupled device 11 to receive analog image density signals $d_N$ in synchronism with teh shift pulse supplied from the sensor 15. The CCD's 80-1 to 80-4 have one, two, three and four elements, respectively, so that CCD 80-4 stores the analog values of previously scanned four picture elements, and CCD 80-3 stores the analog values of previously scanned three picture elements, and so on. The stored analog signals are successively unloaded through respective resistors 81 to the inverting input of an adder 82 and thence to an inverter 83 to derive an average value $d_i$ of the image densities for the four picture elements. On the other hand, the corresponding dot converted signals are successively loaded in response to the shift pulse from the sensor 15 into a 4-bit shift register 84 from the selector 28 and then successively unloaded therefrom in 4-bit parallel form through respective resistors to the inverting input of an adder 86 whose output is coupled to an inverter 87. The output of the inverter 87 represents an average value $d_R$ of the digitally converted signals of the corresponding four picture elements, the signal $d_R$ being coupled to the inverting input of a differential amplifier 88 for comparison with the average signal $d_i$ applied to the noninverting input thereof to detect the difference between them, thereby resulting in a correction signal C at the output of this amplifier. The correction signal is added to the signal $d_N$ from the CCD 11 in an adder 89 to derive a signal $d_N'$ for application to the analog-digital converter 13 which is synchronized with the shift pulse to convert the signal $d_N'$ into corresponding binary signals in four-bit form for application to the selector 28.

The element-by-element conversion of images into digital values is particularly advantageous for transmission to a distant end through digital transmission facilities which are finding widespread use in many applications in place of analog transmission facilities.

The inventive concept could equally be as well used in applications where a plurality of parallel line paths are scanned simultaneously using as many scanning elements and writing heads as there are lines to be simultaneously scanned.

What is claimed is:

1. A signal conversion circuit comprising:

first means for scanning an image field along each of a plurality of parallel line paths of elemental picture areas to detect the image density of each of the scanned elemental areas, a predetermined number of said elemental areas being arranged in rows and columns forming an image field matrix;

second means for selecting a corresponding digital pattern from among a plurality of digital patterns according to the detected image density, each of said digital patterns being composed of a conversion dot matrix having digital values of "1"s and "0"s in a predetermined number and arrangement corresponding to the detected image density, the total number of "1"s and "0"s in said conversion dot matrix being equal to the total number of elemental areas in the corresponding image field matrix; and third means for detecting the presence of a "1" or "0" in the selected digital pattern in a location corresponding to the location of said elemental area in said image field matrix to represent said elemental area by a "1" in a recording field in response to the detection of said "1" or by a "0" in said recording field in response to the detection of said "0", wherein said second and third means comprise:

means for generating a plurality of recurring sequences of binary digits for each said scanned line paths, said binary digits in each of the recurring sequences being shifted in their relative positions in response to the scanning of each elemental area; and means for detecting the presence of a said binary digit in one of said recurring sequences in a response to said detected image density to represent the scanned elemental area with said detected binary digit.

2. A signal conversion circuit comprising:

first means for scanning an image field along each of a plurality of parallel line paths of elemental picture areas to detect the image density of each of the scanned elemental areas, a predetermined number of said elemental areas being arranged in rows and columns forming an image field matrix;

second means for selecting a corresponding digital pattern from among a plurality of digital patterns according to the detected image density, each of said digital patterns being composed of a conversion dot matrix having digital values of "1"s and "0"s in a predetermined number and arrangement corresponding to the detected image density, the total number of "1"s and "0"s in said conversion dot matrix being equal to the total number of elemental areas in the corresponding image field matrix; and third means for detecting the presence of a "1" or "0" in the selected digital pattern in a location corresponding to the location of said elemental area in said image field matrix to represent said elemental area by a "1" in a recording field in response to the detection of said "1" or by a "0" in said recording field in response to the detection of said "0", further comprising:

means for detecting the average value of said detected image densities of previously scanned elemental picture areas;

means for detecting the average value of the digital values which represent said previously scanned elemental picture areas;

means for detecting the difference between said average values; and means for adding said difference value to the detected image density of a subsequently scanned elemental picture area.

3. A conversion circuit as claimed in claim 2, wherein said second means comprises means for varying the total number of said digital values of said conversion dot matrix as a function of said detected image density of each elemental picture area.

4. A conversion circuit as claimed in claim 3, wherein said second means comprises:

means for generating a plurality of groups of recurring sequences of binary digits for each of said line paths, said binary digits in each of said groups being equal in number and shifted in their relative positions in response to the elemental area being scanned; and means for detecting the presence of a said binary digit in one of said recurring sequences in response to said detected image density to represent the scanned elemental area with said detected binary digit.

5. A method of converting images to digital signals for transmission or reproducing, comprising the steps of:

scanning an image field along each of a plurality of parallel line paths of elemental picture areas;

detecting an image density of each of the scanned elemental areas, a predetermined number of the elemental areas being arranged in rows and columns forming an image field matrix;

selecting a corresponding digital pattern from among a plurality of digital patterns according to the detected image density with each of the digital patterns being composed of a conversion dot matrix having a predetermined number of digital values of "1"s and "0"s and an arrangement corresponding to the detected image density, the total number of "1"s and "0"s in the conversion dot matrix being equal to the total number of elemental areas in the corresponding image field matrix; and detecting the presence of a "1" or "0" in the selected digital pattern in a location corresponding to the location of the elemental area in the field matrix to represent the elemental area by a "1" in a recording field in response to the detection of the "1" or by a "0" in the recording field in response to the detection of the "0", wherein the step of selecting the corresponding digital pattern includes the steps of generating a plurality of groups of recurring sequences of binary digits for each of the line paths, the binary digits in each of the groups being equal in number and shifted in relative positions in response to scanning of the elemental area; and detecting the presence of a binary digit in one of the recurring sequences in response to the detected image density to represent the scanned elemental area with the detected binary digit.

6. A method of converting images to digital signals for transmission or reproducing, comprising the steps of:

scanning an image field along each of a plurality of parallel line paths of elemental picture areas;

detecting an image density of each of the scanned elemental areas, a predetermined number of the elemental areas being arranged in rows and columns forming an image field matrix;

selecting a corresponding digital pattern from among a plurality of digital patterns according to the detected image density with each of the digital patterns being composed of a conversion dot matrix having a predetermined number of digital values of "1"s and "0"s and an arrangement corresponding to the detected image density, the total number of "1"s and "0"s in the conversion dot matrix being equal to the total number of elemental areas in the corresponding image field matrix; and detecting the presence of a "1" or "0" in the selected digital pattern in a location corresponding to the location of the elemental area in the field matrix to represent the elemental area by a "1" in a recording field in response to the detection of the "1" or by a "0" in the recording field in response to the detection of the "0", including the additional steps of:

detecting an average value of the detected image densities of previously scanned elemental picture areas;

detecting the average value of the digital values which represent the previously scanned elemental picture areas;

detecting a difference between the average values; and adding the difference value to the detected image density of a subsequently scanned elemental picture.

* * * * *